UNITED STATES PATENT OFFICE.

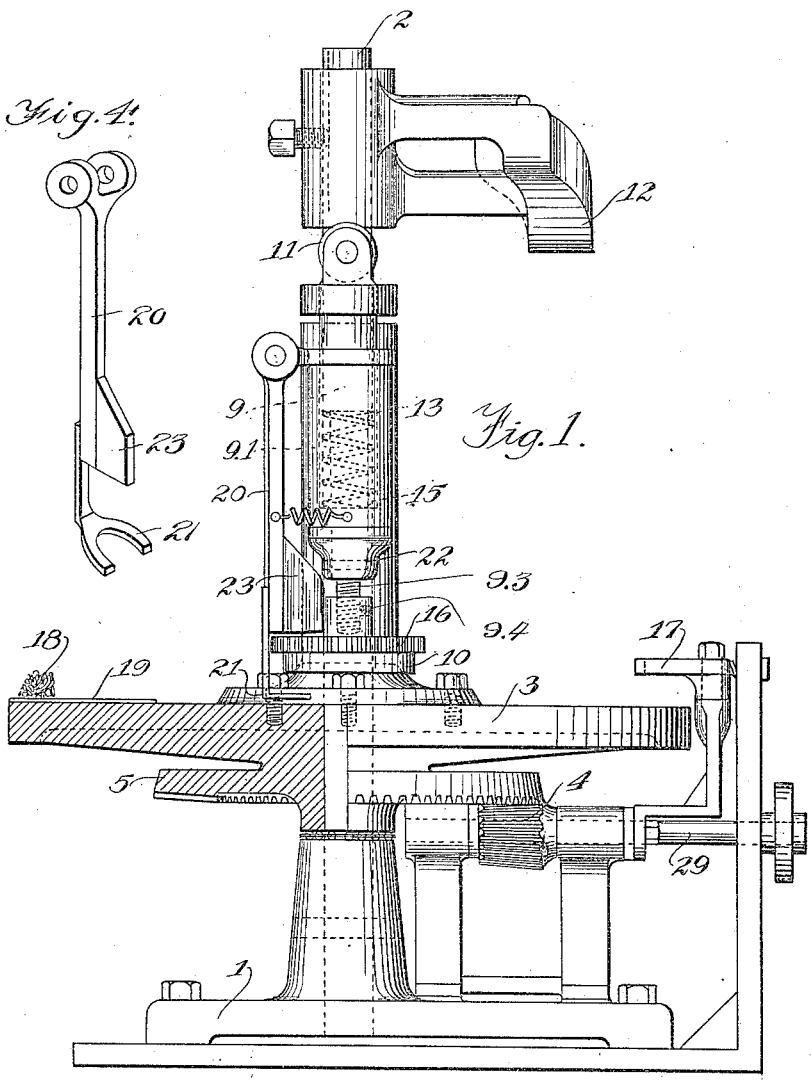

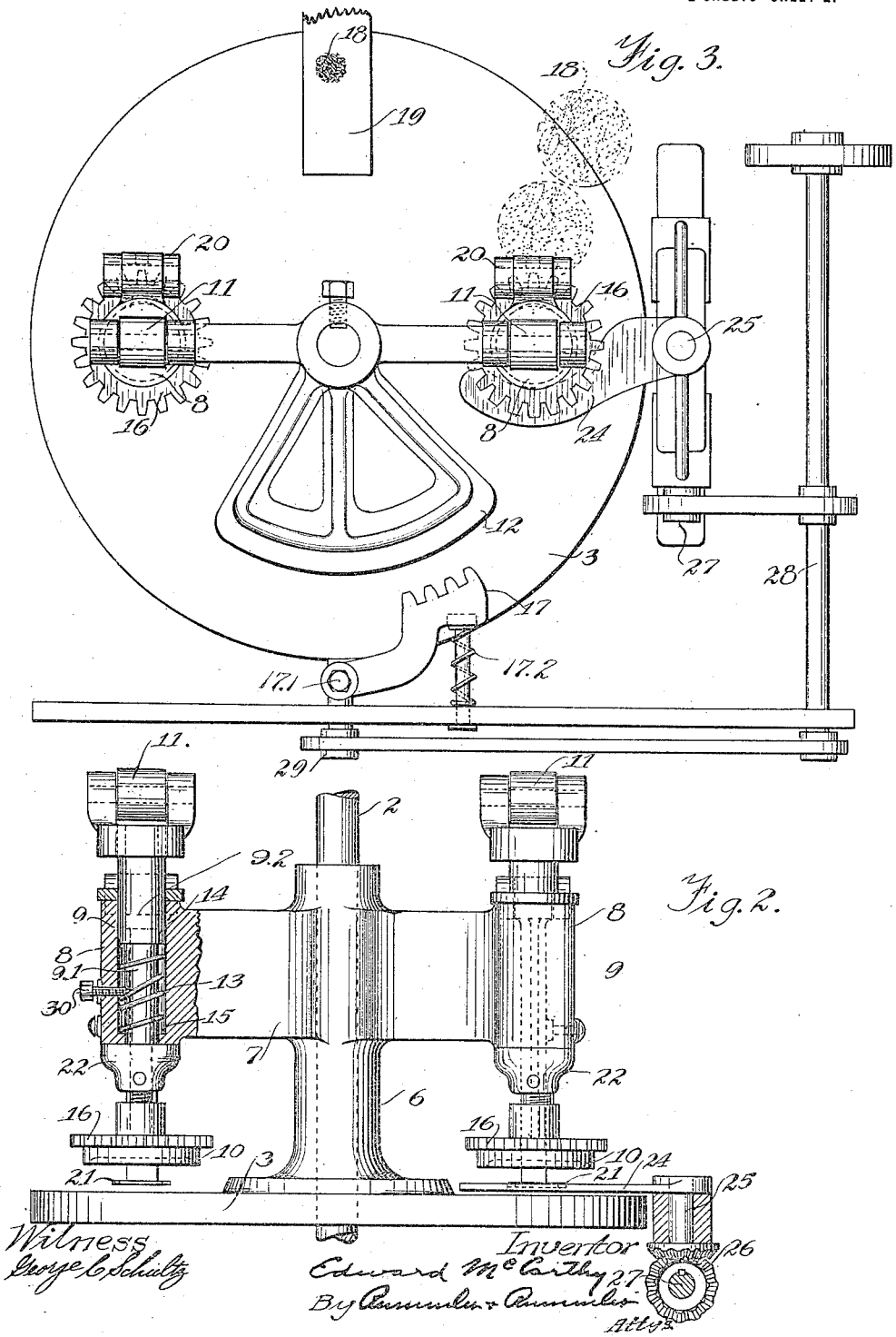

EDWARD FRANCIS McCARTHY, OF CHICAGO, ILLINOIS, ASSIGNOR TO WALTER J. HIRSCH, OF CHICAGO, ILLINOIS.

CANDY-FORMING MACHINE.

1,280,260.      Specification of Letters Patent.      Patented Oct. 1, 1918.

Application filed March 18, 1918. Serial No. 223,063.

*To all whom it may concern:*

Be it known that I, EDWARD FRANCIS MC-CARTHY, a citizen of the United States of America, and a resident of Chicago, county of Cook, and State of Illinois, have invented certain new and useful Improvements in Candy-Forming Machines, of which the following is a specification.

This invention relates to machines for the manufacture of candy, and more particularly to machines intended for forming candy containing nuts or other non-plastic material into small thin disks. The action required of the forming dies or cups is a combined reciprocating and rotary motion and is similar to the action imparted to such forming devices when operated by hand.

An illustrative embodiment of the invention is shown in the accompanying drawings, in which:

Figure 1 is a side elevation, partly in section, of a forming machine constructed according to this invention.

Fig. 2 is a fragmentary side elevation, partly in section, taken at right angles to Fig. 1.

Fig. 3 is a plan view.

Fig. 4 is a perspective view of an arm shown in Fig. 1 and intended for removing portions of candy from the stationary platform and delivering the same to the rotary platform.

In forming candy disks as produced by this machine, a previously weighed quantity of the candy mixture is delivered to a stationary platform above a rotary receiving table. The mechanism is arranged to first push the unformed candy from a stationary platform onto the rotary one below dies which are carried along with the rotary platform, but reciprocate vertically and have an independent rotary motion. Means are provided for camming the dies downwardly and at the same time rotating them, and a separate delivery mechanism is provided for withdrawing the formed disks from the rotary table.

Referring to the drawings, the base 1 of the machine supports a stationary vertical shaft 2 upon which is journaled a rotatable table 3 for supporting the portions of candy operated upon. The table 3 receives motion from the driven pinion 4 meshing with a beveled gear 5 which may be integral with the table 3. A sleeve 6 surrounding the shaft 2 is rigid with the table 3 and extends upwardly therefrom. This sleeve carries a plurality of laterally extending arms 7 which terminate in bearings 8 for supporting hollow spindles 9 of the forming dies 10. The spindles 9 do not rotate, but are arranged to permit rotation of the forming dies 10, which are fast to rotatable spindles 9.1 within the spindles 9. The head 9.2 and the cam or collar 22 of spindle 9.1 prevent longitudinal movement of spindle 9.1 with respect to the spindle 9. The die 10 and gear 16 rigid therewith are secured to the threaded end 9.3 of the spindle 9.1 by a set screw 9.4 (Fig. 1). The spindles 9 carry rollers 11 at their upper ends in position to engage a stationary cam 12 during the rotation of the table 3. After passing the cam 12, the spindles are restored to normal position by the springs 13 bearing between shoulders 14 on the spindle and shoulders 15 provided at the lower end of the bearings 8. The forming dies 10 carry gears 16 which mesh with and are rotated by toothed arms 17, during the engagement of rollers 11 with cam 12. The toothed arm 17 is pivotally mounted on the fixed stud 17.1 (Fig. 3) and is movable against the action of spring 17.2 to prevent breakage in case its teeth do not at once properly mesh with the gears 16 at the time the gears come into engagement with the arm.

For the purpose of removing the portions of candy, indicated at 18, from the stationary platform 19, each die support carries a pivoted arm 20 which is formed and bent at right angles to its length into a fork at its lower end 21. The part 21 of the arms is normally located below the dies 10 and therefore serves to brush the candy from the stationary platform 19 to the platform 3 below the dies. At the time during the operation when the dies move downwardly, a cam member 22 fast to the inner die spindle 9.1 engages a shoulder 23 on the arm 20, rocking it away from the die.

For the purpose of removing the formed candy disks from the platform 3, the rotary arm 24 is arranged to brush over the platform for each rotation of the latter a number of times, corresponding to the number of dies carried by the sleeve 6. The arm 24 is fast to a vertical shaft 25 located at one side of the platform 3 and driven by a pair of beveled gears 26 in turn receiving motion from the power shaft 27. This shaft has a chain and sprocket connection as shown in Fig. 3, to the horizontal shafts 28 and 29, which respectively carry one of the driving pinions 26 and the pinion 4.

In the operation of the device, the previously measured portions of candy are delivered to a stationary platform 9 according to the rate of rotation of the platform 3 and the number of forming dies carried thereby. As the lower ends 21 of the arms 20 pass over the platform 19, the unformed portions of candy are brushed onto the platform 3 beneath the dies 10. Then, when the rollers 11 arrive at the cams 12, the die supporting spindles 9 and 9.1 are forced downwardly against the action of springs 13, the portion 9 being prevented from rotating by the set screw 30, while the die itself receives a rotary motion due to the gear 16 rigid therewith engaging toothed arm 17. The rotary motion of the die is necessary in order to form a fairly circular disk. After the rollers 11 pass clear of the cam 12, the dies are raised by the springs 13. The arm 24 is timed in its motion to brush the formed articles from the platform 3 onto the conveyer or chute after the action of the dies, before the latter arrive above the stationary platform 19.

Although but one specific embodiment of this invention has been herein shown and described, it will be understood that numerous details of the construction shown may be altered or omitted without departing from the spirit of this invention as defined by the following claims.

I claim:

1. A machine of the class described, comprising a rotatable table, a die carried by and above said table, means for reciprocating the die toward and away from the surface of the table, and means for rotating the die during its reciprocating motion.

2. A machine of the class described, comprising a rotary table, a fixed platform above said table adapted to receive articles to be operated upon, a die mounted above said table and carried thereby, means for brushing articles from said stationary platform onto said table beneath the die, and means for reciprocating and rotating said die.

3. In a machine of the class described, the combination with a rotatable table, of a die carried by and above said table and adapted to be reciprocated toward and away from the surface of the table, a gear carried by said die and a toothed member located in position to be engaged by said gear and cause its rotation during the time the die is nearest to the surface of the table.

4. A machine of the class described, comprising a support provided with a fixed upwardly extending vertical spindle, a stationary cam secured to the upper end of said spindle, a table rotatably mounted on said spindle between the cam and the support for the spindle, a die carried by and above said table in position to be engaged and reciprocated toward the table by said stationary cam during the rotation of the table, a gear carried by said die, and a stationary toothed member in position to be engaged by said gear and to rotate the gear when the die is in its lower position.

5. A machine of the class described, comprising a support provided with a fixed upwardly extending vertical spindle, a stationary cam secured to the upper end of said spindle, a table rotatably mounted on said spindle between the cam and the support for the spindle, a die carried by and above said table in position to be engaged and reciprocated toward the table by said stationary cam during the rotation of the table, a gear carried by said die, a stationary toothed member in position to be engaged by said gear and to rotate the gear when the die is in its lower position, and a rotary arm adapted to brush over the surface of said table and below said die after the die has passed said toothed member.

6. A machine of the class described, comprising a support provided with a fixed upwardly extending vertical spindle, a stationary cam secured to the upper end of said spindle, a table rotatably mounted on said spindle between the cam and the support for the spindle, a die carried by and above said table in position to be engaged and reciprocated toward the table by said stationary cam during the rotation of the table, a gear carried by said die, a stationary toothed member in position to be engaged by said gear and to rotate the gear when the die is in its lower position, a movable member carried by said table for holding beneath said die material to be operated upon, and means movable with said die for engaging said movable member and forcing it away from the die as the die moves downwardly.

Signed at Chicago this 4th day of March 1918.

EDWARD FRANCIS McCARTHY.